United States Patent [19]

Mizuhara

[11] Patent Number: 4,591,535

[45] Date of Patent: May 27, 1986

[54] METHOD OF BRAZING CERAMICS USING ACTIVE BRAZING ALLOYS

[75] Inventor: Howard Mizuhara, Hillsborough, Calif.

[73] Assignee: GTE Products Corporation, Stamford, Conn.

[21] Appl. No.: 622,362

[22] Filed: Jun. 20, 1984

[51] Int. Cl.⁴ .................................................. C22C 9/00
[52] U.S. Cl. ..................................... 428/627; 428/621; 428/632; 428/492; 420/489; 420/492; 420/502; 420/512
[58] Field of Search ............... 420/502, 512, 489, 492; 428/469, 621, 632, 627

[56] References Cited

U.S. PATENT DOCUMENTS

| | | | |
|---|---|---|---|
| 2,851,233 | 9/1958 | Hayden | 420/512 |
| 3,373,016 | 3/1968 | Roeder et al. | 420/502 |
| 3,438,819 | 4/1969 | Hicks | 420/512 |
| 3,455,663 | 7/1969 | Zdanuk | 420/502 |
| 4,075,364 | 2/1978 | Panzera | 428/621 |
| 4,182,628 | 1/1980 | D'Silva | 420/502 |
| 4,338,380 | 7/1982 | Erickson et al. | 428/621 |
| 4,497,875 | 2/1985 | Arakawa et al. | 428/621 |

FOREIGN PATENT DOCUMENTS

| | | | |
|---|---|---|---|
| 6026633 | 2/1985 | Japan | 420/492 |
| 512142 | 8/1939 | United Kingdom | 420/492 |
| 2066291 | 7/1981 | United Kingdom | 420/492 |

*Primary Examiner*—Veronica O'Keefe
*Attorney, Agent, or Firm*—Donald R. Castle

[57] ABSTRACT

An article is disclosed consisting essentially of a ceramic substrate bonded to a metal or ceramic member by a brazing alloy. In these processes, the ceramic surface is prepared such that it is relatively defect free prior to brazing.

5 Claims, No Drawings

METHOD OF BRAZING CERAMICS USING ACTIVE BRAZING ALLOYS

FIELD OF THE INVENTION

This invention relates to an article consisting essentially of a ceramic substrate bonded to a metal or ceramic member by a brazing alloy. This invention relates also to several processes for brazing the ceramic to the member.

BACKGROUND OF THE INVENTION

In copending patent applications Ser. No. 394,225, abandoned Ser. No. 422,625, and Ser. No. 420,072 U.S. Pat. No. 4,426,033 assigned to the same assignee as this application, various brazing compositions are disclosed that contain relatively small amounts of active metals selected from the group consisting of titanium, vanadium, zirconium and mixtures thereof. While these alloys overcome various problems associated with use of other materials as titanium hydride in achieving wettability of ceramic substrates, certain applications require extremely high bond strength. A high strength bond in which a ceramic is brazed to a ceramic or metal member would be an advancement in the art.

SUMMARY OF THE INVENTION

In accordance with one aspect of this invention there is provided a process for brazing a ceramic to a member, the process involving grinding and lapping, placing a reactive metal brazing alloy between the ceramic and the member to form an assembly, and heating the assembly to the flow temperature of the brazing alloy.

In accordance with another aspect of this invention there is provided a process for brazing a ceramic to a member, the process involving grinding and heating, placing a reactive metal brazing alloy between the ceramic and the member to form an assembly, and heating the assembly to the flow temperature of the brazing alloy.

In accordance with another aspect of this invention there is provided a process for brazing a ceramic to a member, the process involving firing and tumbling, placing a reactive metal brazing alloy between the ceramic and the member to form an assembly, and heating the assembly to the flow temperature of the brazing alloy.

In accordance with still another aspect of this invention, there is provided an article consisting of a ceramic substrate selected from the group consisting of aluminum oxide, silicon nitride, silicon carbide, and partially stabilized zirconia (PSZ), a member selected from the group consisting of metals and ceramics, and a brazed joint bonding the member and the substrate.

DETAILED DESCRIPTION OF THE INVENTION

This invention relates to an article consisting essentially of a ceramic substrate bonded to a metal or ceramic member by a brazing alloy.

The process of this invention which involves processing the ceramic, using a ductile active brazing alloy and brazing to a metal (or ceramic) member with thermal expansion properties similar to the ceramic results in a ceramic to metal (or ceramic) braze with a high reliability joint. Use of a relatively defect free surface results in about 100% increase in the bond strength of the brazed joint over a brazed joint with an a ground ceramic substrate. Use of an alloy in the form of a foil as described herein protects the active element from reacting with gases or vapors such as nitrogen, hydrogen, oxygen, water, etc. usually found in pumped down vacuum furnace chambers.

The ceramic material can be aluminum oxide, silicon nitride, silicon carbide, or partially stabilized zirconia. Some preferred ceramic compositions are, by weight: (1) about 2% aluminum oxide, about 13% yttrium oxide and the balance a highly pure silicon nitride, (2) about 3.5% aluminum oxide, about 13% yttrium oxide and the balance a relatively impure silicon nitride, (3) about 97.3% aluminum oxide, (4) about 99.5% aluminum oxide, and (5) about 94.0% aluminum oxide. The above compositions are manufactured by WESGO Division of GTE Products Corporation under the trade names of SNW-1000, SNW-2000, Al-300, Al-995 and Al-500, respectively. Another composition is partially stabilized zirconia using magnesium oxide as a stabilizer and made by Nielsen (Australia). Also used is sintered silicon carbide using small addition of boron oxide and carbon. The ceramic is the most critical member of the system because of the inherent brittleness of the material.

The ceramic substrate can be processed in one of several ways depending on the size and shape of the article. For example, a ceramic composition can be pressed, sintered and barrel finished to remove adhered material and irregularities of the surface and also to remove the pressing sharp edge ridge.

Barrel finishing is the tumbling or vibrating of metal parts in a barrel to remove burrs and flash.

For tumbling, the barrel is usually an octagonal, watertight cylinder, 30-60 inches long and ranging in diameter from 24 to 36 inches. It is usually rubber-lined and capable of rotating at variable speeds forward and in reverse.

Vibrating tubs are usually somewhat smaller because the improved efficiency of this method increases the output per unit. The vibration method, though newer than the tumbling system, is rapidly gaining acceptance because of its greater efficiency.

In the barrel along with the objects to be finished are placed a compound, a medium and water. Compounds are specially formulated for specific metals and conditions, but usually contain coloring, cleaning, and burnishing materials, antifoaming agents, a water softener, and a rust inhibitor, with or without a fine abrasive. Media (colloquially "chips") may be natural stone, manufactured abrasive, or bonded abrasive grains in the form of chips or shapes. The medium is usually processed to give it a blocky rather than a slivery shape. Bonded shapes may be round, triangular, tubular, or any shape found practical by the manufacturer. Other media used for special purposes are soft steel and zinc, hardened steel, hardwood, nylon, sawdust, and abrasive imbedded in rubber.

Tumbling media range in size from 1½ to 2 inches to as small as 1/32 inch.

A small cylinder of about ¼ inch diameter by about ¼ inch long to about ½ inch diameter to about ½ inch long can be brazed across the face without grinding. A larger cylinder of about 2 inches to about 8 inches in diameter requires grinding to overcome the firing distortion. Grinding is the removal of irregularities from a surface. Grinding is done with an abrasive material. Generally diamond is used as the abrasive material in this process. Grinding fluids can be used to cool the workpiece and to act as a lubricant for the abrasive during the grinding operation. Some commonly used grinding fluids are grinding oils, soluble oils, chemical fluids, and gases. The diamond ground sintered part results in surface microcracking resulting in an appreciably lowered modulus or rupture. By heating the ground ceramic up to the temperature at which the liquid phase is present to heal the microcrack, and the preground modulus of rupture is restored. The more precision parts require grinding followed by lapping. Lapping is a process to refine the surface finish and geometrical accuracy of flat, cylindrical, and spherical surfaces. Generally the workpiece has the abrasive forced against it by a plate (the lap), the abrasive being present in a liquid vehicle or carrier. Generally, the abrasive used in this process is diamond from 1 to 6 micrometers in diameter and the liquid carrier is glycerol. The lap is usually softer than the workpiece and the abrasive is forced into the lap, in which position it cuts the workpiece. In this process, about 2 mils of material are removed from the surface by lapping.

After the processing of the ceramic substrate, the next step is the placing of a reactive metal brazing alloy between the ceramic substrate and the metal or ceramic member to form an assembly, followed by heating the assembly to the flow temperature of the brazing alloy. The molten brazing alloy is set to "wet" the ceramic. This means that the contact angle of the molten alloy reaches zero degrees and the alloy flows. The contact angle for a given system is temperature dependent and for the ceramic a higher temperature is required to wet when compared to a metal surface.

The member can be either metal or ceramic of thermal expansion properties close to that of the substrate. The metal member should not react or alloy with the brazing alloy during the course of the brazing. For example, an alloy of about 3% by weight Ti, about 27% by weight Cu, and about 70% by weight Ag will show minimum alloying with an alloy of about 42% by weight Ni, and about 58% by weight Fe, however a TiAgCu alloy will react rapidly with copper and can create a brazing problem.

Approximate compositions of some active brazing alloys are by weight: (1) about 3% by weight Ti, about 27% by weight Cu and the balance Ag, under the name of Cusil ABA, (2) about 24% by weight Cu, about 14% by weight In, about 1.5% by weight Ti, and the balance Ag, under the name of Incusil ABA, (3) about 1% by weight Ti, about 18% Ni and the balance Au under the name of Nioro ABA, and (4) about 3% by weight Zr and the balance Cu. The above compositions are made by WESGO Division of GTE Products Corporation.

To more fully illustrate this invention the following non-limiting examples are presented. All parts, portions, and percentages are on a weight basis unless otherwise stated.

EXAMPLES

The following ceramic substrates are brazed to the following ceramic or metal members with the given brazing alloys at the given temperatures. All percentages are in by weight.

| Ceramic Substrate | Member | Brazing Alloy | Temp °C. |
|---|---|---|---|
| PSZ | PSZ | 70% Ag, 27% Cu, 3% Ti | 850 |
| PSZ | Ductile Iron | 70% Ag, 27% Cu, 3% Ti | 860 |
| PSZ | 410 Stainless Steel | 81% Au, 18% Ni, 1% Ti | 1000 |
| PSZ | 1010 Steel | 70% Ag, 27% Cu, 3% Ti | 850 |
| PSZ | Copper | 70% Ag, 27% Cu, 3% Ti | 850 |
| PSZ | alloy of Ni, Fe, Co | 60.5% Ag, 24% Cu, 14% In, 1.5% Ti | 770 |
| 2% $Al_2O_3$, 13% $Y_2O_3$, balance $Si_3N_4$ | 2% $Al_2O_3$, 13% $Y_2O_3$, balance $Si_3N_4$ | 97% Cu, 3Zr | 1125 |
| 2% $Al_2O_3$ 13% $Y_2O_3$, balance $Si_3N_4$ | Ductile Iron | 70% Ag, 27% Cu, 3% Ti | 850 |
| 3.5% $Al_2O_3$, 13% $Y_2O_3$, balance $Si_3N_4$ | alloy of Ni, Fe, Co | 60.5% Ag, 24% Cu, 14% In, 1.5% Ti | 770 |
| 3.5% $Al_2O_3$, 13% $Y_2O_3$, balance $Si_3N_4$ | 1010 Steel | 70% Ag, 27% Cu, 3% Ti | 850 |
| 2% $Al_2O_3$ 13% $Y_2O_3$, balance $Si_3N_4$ | 410 Stainless | 60.5% Ag, 24% Cu, 14% In, 1.5% Ti | 770 |
| 99% SiC, 1% $B_2O_3$ | Copper | 60.5% Ag, 24% Cu, 14% In 1.5% Ti | 770 |
| 99% SiC, 1% $B_2O_3$ | 1010 Steel | 60.5% Ag, 24% Cu, 14% In 1.5% Ti | 770 |

While there has been shown and described what set at present considered the preferred embodiments of the invention, it will be obvious to those skilled in the art that various changes and modifications may be made therein without departing from the scope of the invention as defined by the appended claims:

What is claimed is:

1. An article consisting essentially of:
    (a) a ceramic substrate selected from the group consisting of aluminum oxide, silicon nitride, silicon carbide, and partially stabilized zirconia,
    (b) a member selected from the group consisting of metals and ceramics and,
    (c) a brazed joint bonding said member and said substrate, said braze being selected from the group consisting essentially of, in percent by weight, (1) from about 25% to about 29% Cu, from about 1% to about 3% Ti and the balance Ag, (2) from about 22% to about 26% Cu, from about 9% to about 16% In, from about 1% to about 3% Ti and the balance Ag, (3) from about 16% to about 20% Ni, from about 1% to about 3% Ti and the balance Au, and (4) from about 2% to about 5% Zr and the balance Cu.

2. An article according to claim 1 wherein the brazing alloy composition consists essentially of in percent by weight: about 27% Cu, about 3% Ti, and the balance Ag.

3. An article according to claim 1 wherein the brazing alloy composition consists essentially of in percent by weight: about 24% Cu, about 14% In, about 1.5% Ti and the balance Ag.

4. An article according to claim 1 wherein the brazing alloy composition consists essentially of in percent by weight about 18% Ni, about 1% Ti, and the balance Au.

5. An article according to claim 1 wherein the brazing alloy composition consists essentially of in percent by weight about 4% Zr and the balance Cu.

* * * * *